US007080155B1

(12) United States Patent
Hericourt

(10) Patent No.: US 7,080,155 B1
(45) Date of Patent: Jul. 18, 2006

(54) SYSTEM AND METHOD FOR ACCESSING A SOCKS SERVER FROM AN END USER WORKSTATION IN AN IP NETWORK

(75) Inventor: Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 09/665,019

(22) Filed: Sep. 19, 2000

(30) Foreign Application Priority Data

Oct. 21, 1999 (EP) .................................. 99480101

(51) Int. Cl.
*G06F 15/16* (2006.01)

(52) U.S. Cl. ...................... 709/238; 709/229; 709/228; 713/207; 713/151

(58) Field of Classification Search ................ 709/238, 709/229; 713/207, 223, 151
See application file for complete search history.

(56) References Cited

U.S. PATENT DOCUMENTS 5,892,903 A * 4/1999 Klaus .................... 395/187.01
6,085,249 A * 7/2000 Wang et al. ................. 709/229
6,466,984 B1 * 10/2002 Navch et al. ................ 709/228
6,477,577 B1 * 11/2002 Asano ......................... 709/227
6,529,517 B1 * 3/2003 Hrastar et al. .............. 370/401

* cited by examiner

*Primary Examiner*—Jason Cardone
*Assistant Examiner*—Adnan Mirza
(74) *Attorney, Agent, or Firm*—John R. Pivnichny; Dillon & Yudell LLP

(57) ABSTRACT

A method and system for setting a value within a type of service field in an Internet Protocol (IP) datagram in accordance with an application level protocol at which said IP datagram is transported within a socks connection from a source application that resides within a source device to a destination application that resides within a destination device. The method includes determining IP addresses of the source and destination devices. The application level protocol for the source and destination devices are then determined utilizing the port addresses to which and from which the IP datagram is sent. The IP addresses for the source and destination nodes as well as the identity of the application level protocols corresponding to the source and destination applications are then indexed in a first table. A type of service value to be encoded within the IP datagram is then determined and written into the type of service field of the IP datagram.

18 Claims, 11 Drawing Sheets

Logical View of an End User Accessing the World-Wide-Web

General Physical View of an End User Accessing the World-Wide-Web

Socks Definition Builder Component

Socks TOS Builder Component

SYSTEM AND METHOD FOR ACCESSING A SOCKS SERVER FROM AN END USER WORKSTATION IN AN IP NETWORK

BACKGROUND OF THE INVENTION

1. Technical Field

The present invention relates to computer networks, and more particularly to a method and system for setting the value of the Type Of Service (TOS) field of an IP Datagram according to the Application Level protocol used by Socks data in an end user workstation attached to an Internet Protocol (IP) network.

2. Description of the Related Art

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

(1) transmitting and receiving electronic mail, (2) logging into remote computers (the "Telnet"), and (3) transferring files and programs from one computer to another ("FTP" or "File Transfer Protocol").

TCP/IP

The Transmission Control Protocol/Internet Protocol (TCP/IP) protocol suite is used to establish an interconnection of networks that provide universal communication services: an internetwork, or internet. Each physical network has its own technology dependent communication interface (in the form of a programming interface) that provides basic communication functions between the physical network and the user applications. The architecture of the physical networks is hidden from the user. TCP/IP also provides interconnection between different physical networks to form what appears to the user to be one large network.

TCP is a transport layer protocol providing end-to-end data transfer and is responsible for providing a reliable exchange of information between networked computer systems. Multiple applications can be supported simultaneously over one TCP connection between two computer systems.

IP is an internetwork layer protocol hiding the physical network architecture bellow it. Part of the communicating messages between computers is a routing function that ensures that messages will be correctly directed within the network to be delivered to their destination. IP provides this routing function. An IP message is called an IP Datagram.

Application Level protocols are utilized in addition to TCP/IP to transfer user and application data from a computer system to a destination computer system.

Examples of such Application Level protocols include File Transfer Protocol (FTP), Telnet, Gopher, Hyper Text Transfer Protocol (HTTP).

IP Router

A "router" is a computer that interconnects two networks and forwards messages from one network to the other. Routers select the best transmission path between networks utilizing the IP layer of the TCP/IP protocol stack, such that any host (or computer) or workstation running TCP/IP over more than one interface could, in theory, forward messages between networks. Because IP implements basic routing functions, the term "IP router" is often used. However, dedicated network hardware routers can provide more sophisticated routing functions than the minimum functions implemented in IP.

World Wide Web

With the increasing size and complexity of the Internet, tools that are often called navigators or navigation systems have been developed to help find information on the network. Navigation systems include standards such as Archie, Gopher and, most well-known, the World Wide Web ("WWW" or "the Web"). In addition to serving as an Internet-based navigation system, the Web is also an information distribution and management system for the Internet. The Web provides an end user with a seamlessly integrated format of information, including still images, text, audio and video. A user on the Web using a graphical user interface may transparently communicate with different host computers on the system, different system applications, and different information formats for files and documents including text, sound, and graphics.

Hypermedia

The Web uses hypertext and hypermedia. Hypertext is a subset of hypermedia and refers to computer-based "documents" in which readers move from one place to another in a document, or to another document, in a non-linear manner. To accomplish this, the Web uses a client-server architecture. Web servers enable a user to access hypertext and hypermedia information through the Web and the user's computer. (The user's computer is referred to as a client computer of the Web Server computers.) Clients send requests to Web servers, which react, search, and respond. The Web allows client application software to request and receive hypermedia documents (including formatted text, audio, video and graphics) with hypertext link capabilities to other hypermedia documents, from a Web file server. The Web, thus, can be viewed as a collection of document files residing on Web host computers that are interconnected by hyperlinks using networking protocols, forming a virtual "web" that spans the Internet.

Uniform Resource Locators

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Hyper Text Transfer Protocol

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web servers use a Hyper Text Transfer Protocol (HTTP) to communicate with Web clients. All types of data can be exchanged among Web servers and clients using HTTP, including Hyper Text Markup Language (HTML), graphics, sound and video. HTML describes the layout, contents and hyperlinks of the documents and pages. When browsing, a Web client converts user specified commands into HTTP GET requests, connects to the appropriate Web server to retrieve information, and waits for a response. The response from the server can be the requested document or an error message.

Browser

A Web client is also referred to as a Web browser, since it in fact browses documents retrieved from the Web Server. After receiving data from a server, a Web client formats and presents the data or activates an ancillary application such as a sound player to present the data. To do this, the server or the client identifies the various types of data received.

Intranet

Some companies use a mechanism similar to the Web to communicate inside their own corporation. Such a mechanism is called an "Intranet". These companies use the same networking/transport protocols and locally based Web servers to provide access to vast amount of corporate information in a cohesive fashion. As this data may be private to the corporation, and because the members of the company still require access to public Web information, they protect the access to their network by using a special protective system called a "firewall".

Firewall

A Firewall protects one or more intranet computers having Internet connections from access by external computers connected to the Internet. A firewall is a network configuration, usually created by hardware and software, that forms a boundary between networked computers within the firewall from those outside the firewall. The computers within a firewall form a secure sub-network with internal access capabilities and shared resources not available to outside computers.

Access to both internal and external computers is often controlled by a single machine comprising the firewall. Since this firewall computer directly interacts with the Internet, strict security measures against unwanted access from external computers are required.

Firewalls are commonly used to protect information such as electronic mail and data files within a physical building or an organization site. A firewall reduces the risk of intrusion by unauthorized people from the Internet by utilizing "proxies" or "socks" to control the access to information from each side of the firewall.

Proxy Server

An HTTP proxy is a special server that typically runs in conjunction with firewall software and allows an access to the Internet from within a firewall. Access by a proxy server is performed as follows. First the proxy server waits for a request (a HTTP request for example) from inside the firewall and forwards the request to the remote server outside the firewall. The proxy server then reads a response and sends the response back to the client.

A single computer can run multiple servers, each server connection identified by a port number. A proxy server, like an HTTP Server or a FTP server, occupies a port. Typically, a connection uses standardized port numbers for each protocol (for example, HTTP=80 and FTP=21). For this reason, an end user must select a specific port number for each defined proxy server. Web browsers usually allow an end user to set the host name and port number of the proxy servers in a customization panel. Protocols such as HTTP, FTP, Gopher, WAIS, and Security usually have designated proxies.

Socks and Socks Server

Socks is a protocol which encapsulates Application Level protocols (for instance FTP, Telnet, Gopher, HTTP). Using Socks, the Application Level traffic between a system running a socks client software and a system running a socks server software is encapsulated in a virtual socks tunnel between both systems. Socks is primarily used by systems within an Intranet in order to gain a secure access to systems located outside the Intranet.

A Socks Server acts as a relay between the systems within the Intranet and the systems outside the Intranet, thus hiding the internal systems from the external Internet and is thus one possible form of firewall. A socks server (also called a socks gateway) is a software entity that allows computers inside a firewall to gain access to the Internet. A socks server is usually installed on a server positioned either inside or on the firewall. To reach the Internet, computers within a firewall access the socks server as socks clients. Web browsers usually permit an end user to set the host name and port number of the socks servers in a customizable panel. In some operating systems, the socks server is specified in a separate file (e.g. socks.conf file). Socks servers act as a protocol layer underneath the standard TCP/IP protocols (HTTP, FTP, . . . ), and therefore cannot decode these protocol layers to determine what kind of data is being transferred.

Dispatcher System

When multiple Firewalls are used to gain access to systems outside the Intranet, a dedicated device called "Dispatcher System" is often used within the Intranet for dispatching the traffic to these multiple Firewalls. The main goal of the Dispatcher System is to balance the load across the multiple Firewalls. For instance when a very powerful Firewall and a smaller Firewall are available, more traffic should be dispatched on the very powerful Firewall than on the smaller one. Such Dispatcher Systems are either dedicated hardware devices, or software components installed on existing network device (such as an IP Router).

More detailed explanations regarding the technical field as presented in the above sections can be found in the following publications incorporated herewith by reference:

"*TCP/IP Tutorial and Technical Overview*" by Martin W. Murhammer, Orcun Atakan, Stefan Bretz, Larry R. Pugh, Kazunari Suzuki, David H. Wood, International Technical Support Organization, October 1998, GG24-3376-05.

"*Java Network Programming*" by Elliotte Rusty Harold, published by O'Reilly, February 1997.

"*Internet in a nutshell*" by Valerie Quercia, published by O'Reilly, October 1997.

"*Building Internet Firewalls*" by Brent Chapman and Elizabeth Zwichky, published by O'Reilly, September 1995.

A problem arises in differentiating IP datagrams transporting Socks data in accordance with the Application Level protocol utilized to transport Socks data. The Socks protocol is a form of encapsulation of Application Level traffic such as HTTP, FTP, Telnet.

When Socks servers are used within an Intranet to provide secure access to systems located outside the Intranet, IP routers and network devices within this Intranet only see and handle Socks traffic. As a consequence, all Application Level protocols encapsulated by Socks are treated alike within the TCP/IP network.

When multiple Socks servers are used within the Intranet to access systems outside the Intranet, a dedicated device called a "dispatcher system" is often used for dispatching the traffic on these multiple Socks servers. The purpose of the dispatcher system is mainly to balance the load across the multiple Socks servers. For instance, when a larger Socks server and a smaller Socks server are both available, more traffic can be dispatched on the larger Socks server than on the smaller one.

In a Socks environment, the dispatcher system usually only sees and processes Socks traffic and is unable to distinguish the Application Level protocol which is encapsulated by Socks. As a consequence, all Application Level protocols such as HTTP, FTP, Telnet, are then treated alike by the dispatcher system. To solve this problem, the dispatcher system and any other IP network devices, such as IP routers, can use a Type Of Service (TOS) field in the header of IP datagrams comprising Socks data. For example, based on the TOS field, interactive Telnet traffic can be processed by a dispatcher system with a higher priority than batch FTP traffic. This Telnet traffic can be dispatched on a high capacity Socks server while the FTP traffic is dispatched on a lower capacity Socks server.

It would therefore be useful to set the value of the Type Of Service (TOS) field in IP datagrams comprising Socks data, according to the Application Level protocol used in the IP datagrams. Current solutions to address this problem include the following.

The Type Of Service (TOS) field can be set by a network device according to the protocol of the TCP data transported in the IP datagrams. That protocol is identified by the Destination Port field of the TCP header within the IP Datagram. The major drawback of this approach is that in a Socks environment, the protocol of the TCP data transported in IP datagrams is always the Socks protocol. As a consequence, the TOS field always has the same value which corresponds to the Socks protocol. The TOS field is therefore not representative of the Application Level protocol of Socks data. For example, IP datagrams transporting HTTP, FTP, or Telnet data over Socks all have the same TOS value. The TOS field cannot be used to differentiate the IP datagrams according to the Application Level protocol of Socks data since this field always has the same unique value.

An alternate approach to the problem is to set the TOS field utilizing a network device, such as a router. The main drawbacks of this solution are that the association between TOS value and Application Level protocol is implemented by a network device within the Intranet, and not by the end user workstation. Some Service Providers may not use the particular network device within their IP network. As a consequence, companies which lease rather than own an Intranet network, may not be able to take advantage of this approach. In addition network device processing and memory resources will be negatively impacted by having to store and implement TOS values within a TOS field.

SUMMARY OF THE INVENTION

The present invention discloses a method and system for setting a value within a type of service field in an Internet Protocol (IP) datagram in accordance with an application level protocol at which said IP datagram is transported within a socks connection from a source application that resides within a source device to a destination application that resides within a destination device. The method includes determining IP addresses of the source and destination devices. The application level protocol for the source and destination devices are then determined utilizing the port addresses to which and from which the IP datagram is sent. The IP addresses for the source and destination nodes as well as the identity of the application level protocols corresponding to the source and destination applications are then indexed in a first table. A type of service value to be encoded within the IP datagram is then determined and written into the type of service field of the IP datagram.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE PREFERRED EMBODIMENT

Figure 1:
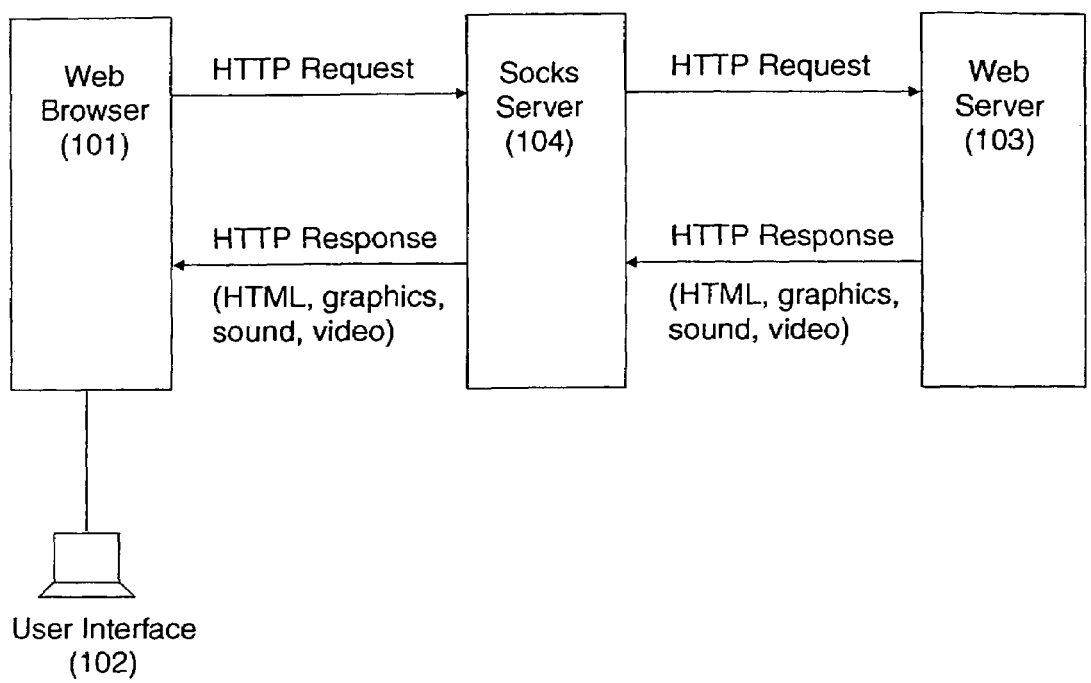
FIG. 1 is a logical view of an end user system accessing the World Wide Web, according to prior art.

FIG. 1 shows a user system with a user interface (102) comprising a Web browser (101) for accessing the World-Wide-Web (WWW). Data is transferred in the WWW using the HTTP protocol. HTTP requests and responses are exchanged between Web browser program (101) and a destination Web Server (103) containing the WWW information the user wants to access. A Socks server (104), between Web browser (101) and Web Server (103), acts as an intermediary HTTP Relay forwarding the HTTP requests and responses to their destination. Web browser program (101) makes an HTTP request to Socks server (104) which forwards the request to destination Web Server (103). The flow in the reverse direction (HTTP response) again goes via Socks server (104) to Web browser (101). In this way, Socks server (104) can limit the traffic to authorized transactions according to its configuration possibly based on a defined security and access control policy. Socks server (104) thus protects the network where Web browser (101) is located.

Physical View

Figure 2:
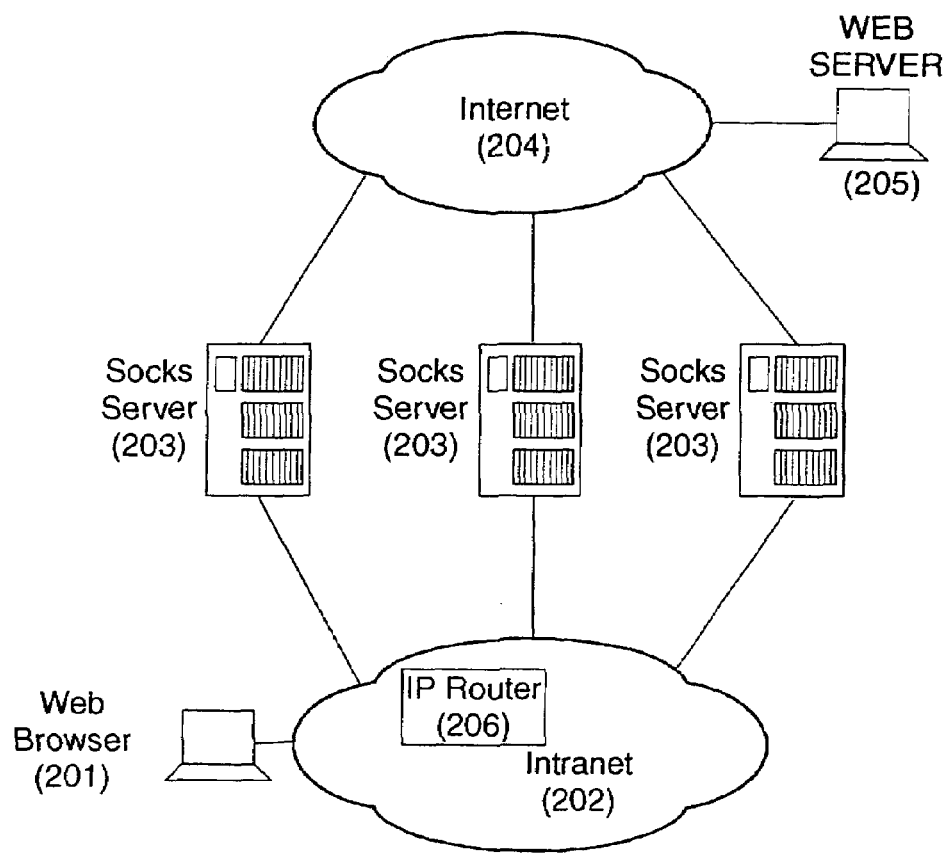
FIG. 2 is a general view of an end user system accessing the World Wide Web according to prior art.

FIG. 2 is a physical view of the logical system arrangement depicted in FIG. 1. In this particular example, a Web browser (201) runs on a system (workstation) connected to an Intranet (202) network. Intranet network (202) comprises network devices such as IP routers (206). Socks servers (203) protect both (private) Intranet (202) and Internet in (204) which is public. A Web Server (205) is also connected to the Internet (204). It is important to note that Socks servers (203) connect two networks and hence act as intermediaries for communications between the two networks.

Multiple Socks servers are often used in order to provide access robustness and load sharing.

IP Datagram

Figure 3:
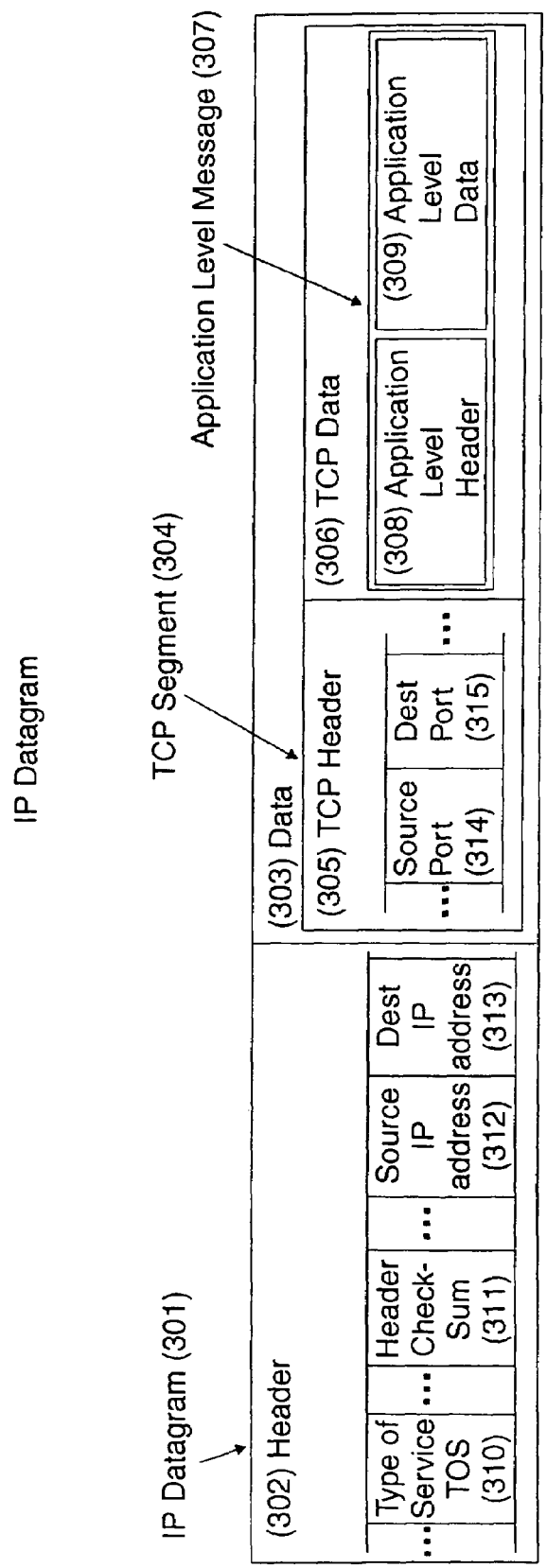
FIG. 3 shows an IP Datagram according to prior art.

The transfer unit of a data packet in TCP/IP is referred to herein as an IP datagram. It is made up of a header containing information for IP protocol and data that is only relevant to the higher level protocol. FIG. 3 shows the format of an IP datagram (301) as implemented within the environment described in FIGS. 1 and 2.

IP datagram (301) is a message exchanged between computer systems across a TCP/IP network. As illustrated in FIG. 3, IP datagram (301) is divided into a header (302) and data (303). IP datagram header comprises a Type of Service (TOS) field (310) and is mainly used to route the IP datagram to its final destination. Data within TOS field (310) provides an indication of the quality of service requested for IP datagram (301). This quality of service request can be used to characterize the nature and the priority of IP datagram (301). A TOS value within TOS field (310) can be set either by the system initiating the connection (the source device), or on the fly by a network device (for instance an IP router) within the network.

A Source IP Address (312) provides an IP address of the source device which sends IP datagram (301). A destination IP Address (313) provides an IP address of the destination device which receives IP datagram (301). A header checksum (311) is used by the destination device for checking that all fields in IP datagram header (302) have not been altered in the network. A header checksum (311) is a combination of all fields in IP datagram header (302).

An IP datagram data field (303) includes the data sent by the source device to the destination computer system. The destination computer system processes this data. Since the TCP/IP protocol suite is organized in layers, IP datagram data field (303) contains a message relevant to a higher level protocol, such as TCP. Within IP datagram field (303) is a TCP segment (304) which is a common name for a TCP message.

A TCP header (305) includes a source port field (314) and the destination port field (315) which identify the application protocol (e.g. HTTP, FTP, Telnet, Socks) transported by TCP. TCP header (305) is mainly used by the destination of the IP datagram to determine which application must process the data transported by TCP.

Also within TCP segment (304) is a TCP data field (306) that contains application data which are sent by the source device to the destination computer system. The destination computer system processes the data. Since the TCP/IP protocol suite is organized in layers, TCP data field (306) contains the information relevant to a higher Application Level protocol such as HTTP, FTP, Telnet, Socks.

As further depicted in FIG. 3, TCP data field (306) of the IP datagram contains an Application Level message (307) that may be, for example, a Socks message (for instance a "CONNECT" or a "BIND" message), a HTTP message, a FTP message, or a telnet message. Depending on the Application level protocol, Application Level message (307) can also be split into an Application Level header (308) which is the header relevant to the application protocol such as HTTP, FTP, Telnet, and Application Level data (309) which contains data that is processed by the application responsible for handling the Application Level protocol. Application Level data (309) is usually the data which is directly relevant to the end user (for instance, data entered by an end user on his workstation).

Socks Client and Socks Server

Figure 4:
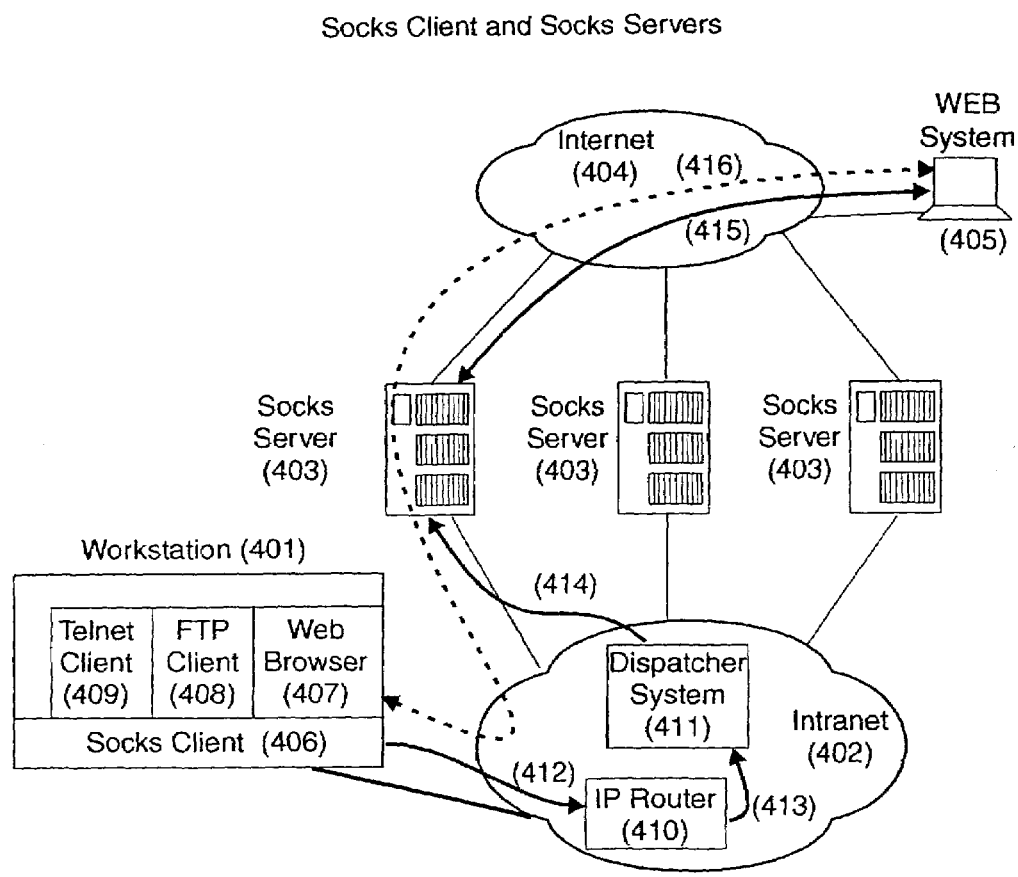
FIG. 4 is a general view of a Socks Client with a plurality of Socks servers according to prior art.

A Socks is a well-known type of networking proxy protocol that allows client workstations to gain full access to hosts outside their local network while providing a high degree of security. FIG. 4 shows an end user workstation (401) connected to an Intranet (402). Several Socks servers (403) that protect Intranet (402) connect private Intranet (402) to a public Internet (404). A destination Web system (405) is also connected to Internet (404) (the Web system is for instance a Web browser, a FTP server, or any system attached to the Internet (404) that can be accessed from the Intranet (402)).

As further depicted in FIG. 4, an end user workstation (401) includes a software program called Socks client (406) that provides a secure access to the World-Wide-Web (WWW) via Socks servers (403). Socks client (406) creates some form of "virtual tunnel" between workstation (401) and Socks servers (403). A Socks protocol is independent of any Application Level protocol, and can therefore be used for HTTP, FTP, or Telnet communications.

When multiple Socks servers (403) are used to access WEB Systems on Internet (404), a dispatcher system (411) is often used to balance the traffic load across multiple Socks servers (403). End user workstation (401) thus accesses Socks servers (403) by means of dispatcher system (411) which acts as one virtual single Socks server.

The IP router (410) within Intranet (402) routes each IP datagram it receives towards its destination. The IP router determines the next hop (413), using the Destination IP Address field in the IP datagram header. WEB applications running on an end user workstation (such as a Web browser (407), an FTP Client (408), or a Telnet Client (409)) use the services of a Socks client (406) to gain access to an outside WEB System (405). The Socks client located on the end user workstation sends (412) each IP datagram on the Intranet network to a destination Socks server. IP routers within the Intranet receive the IP datagrams and route them (413) towards their destination. The dispatcher system (411) which is viewed by Intranet as a Socks server receives the IP datagrams. The dispatcher system selects for each IP datagram the "best" Socks server, and forwards each IP datagram to the selected Socks server. The Socks server authenticates the user, authorizes the request, establishes a connection (415) with the outside WEB System, and then transparently forwards application data between the end user workstation and the WEB System (416).

Figure 5:
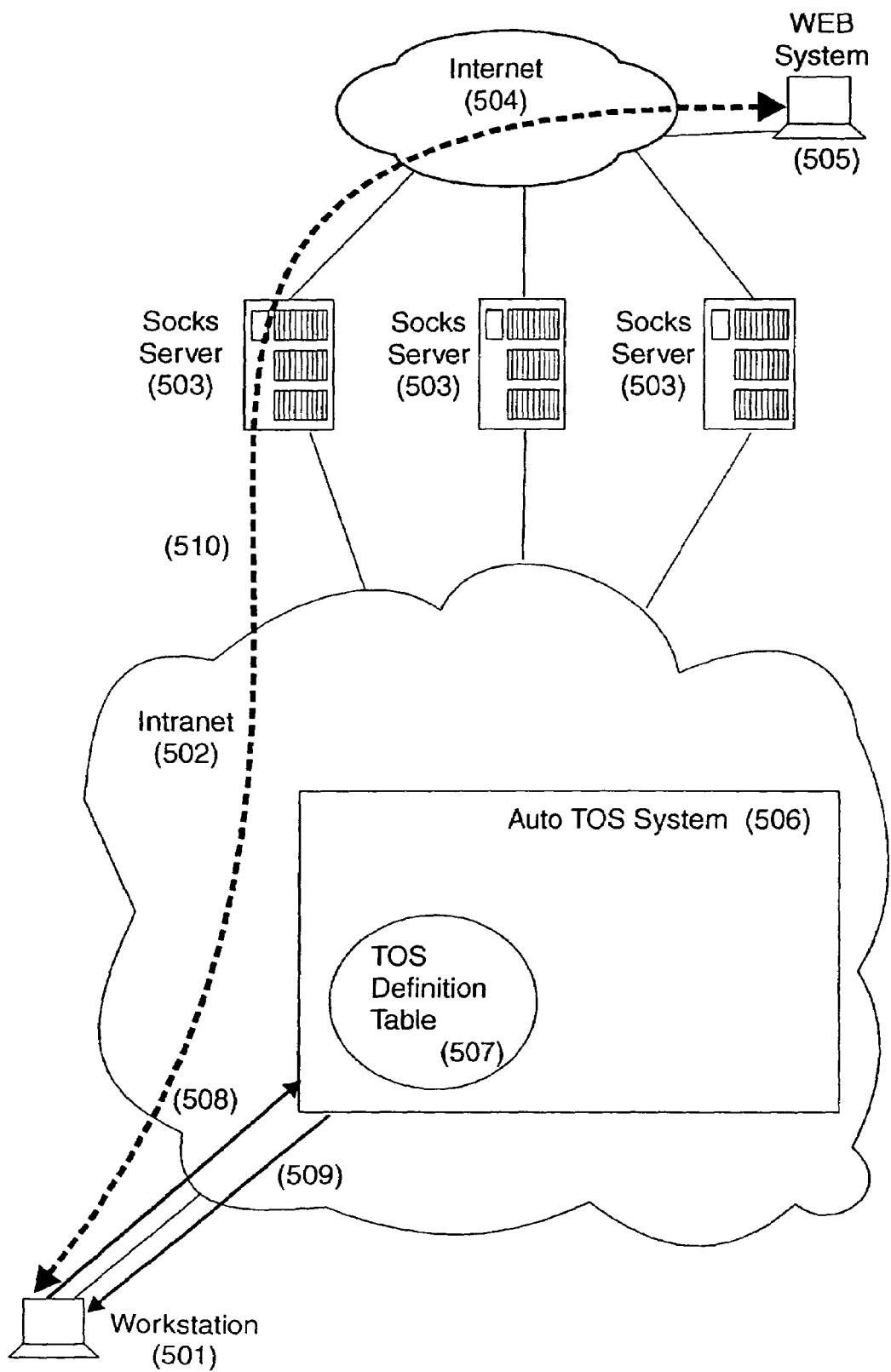
FIG. 5 is a general view of an end user workstation retrieving from an Auto TOS System the Type Of Service (TOS) values associated with the Application Level protocols used by Socks data according to the present invention.

Auto TOS System The present invention relates to a system and method for setting the Type Of Service (TOS) field of IP datagrams transporting Socks data according to the Application Level protocol used by the Socks data. FIG. 5 is a general view of an end user workstation retrieving from an Auto TOS System the Type Of Service (TOS) values associated with the Application Level protocols used by Socks data according to the present invention.

An end user workstation (501) comprising a Socks client is connected to the Intranet (502), the Intranet comprising multiple Socks servers (503) for accessing the WEB System (505) connected to the Internet (504). An AutoTOS system (506) located within the Intranet (502) is in charge of providing the information (507) required for configuring end user workstations connected to the Intranet. Said information is comprised in a table called "TOS Definition table" (507). This table associates each Application Level protocol used by Socks data with a Type Of Service (TOS) value. For instance, the TOS Definition table may associate the FTP protocol with a TOS value of 0, the Telnet protocol with a TOS value of 1, and the HTTP protocol with a TOS value of 7.

In a preferred embodiment, the TOS Definition table is a flat file and is created and maintained for instance by a Network Administrator. Before accessing (510) the World Wide Web, the end user workstation (501) gets connected (508) to the AutoTOS system and retrieves (509) the TOS Definition table (507) which located in the AutoTOS system (506) using, for instance, the HTTP protocol or any file transfer protocol such as FTP. The TOS Definition table (507) can be statically defined on the AutoTOS system. In this case, the same TOS Definition table is retrieved by all end user to workstations. This way, all end user workstations will use the same TOS values for the same Application Level protocols, therefore providing a consistent TOS definition within the whole Intranet. For instance, all end user workstations within the network will use a TOS value of 0 for the FTP protocol.

TOS definition table may alternatively be dynamically built when the end user workstation requests the AutoTOS system to send back the TOS Definition table. The table can be for instance dynamically built by a CGI (Common Gateway Interface) computer program running on AutoTOS system (506).

The TOS Definition tables returned to the different end user workstations may be different according to some criteria such as the IP address of the end user workstation. For instance, one group of users (group0) may use a TOS value of 0 for FTP, while another group of users (group1) may use a TOS value of 1 for that same FTP protocol. IP datagrams having a TOS value of 1 will be processed with a higher priority than IP datagrams having a TOS value of 0. The FTP service provided to group1 will offer better performances than the FTP service provided to group0.

IP Datagram Routing and Dispatching

Figure 6:
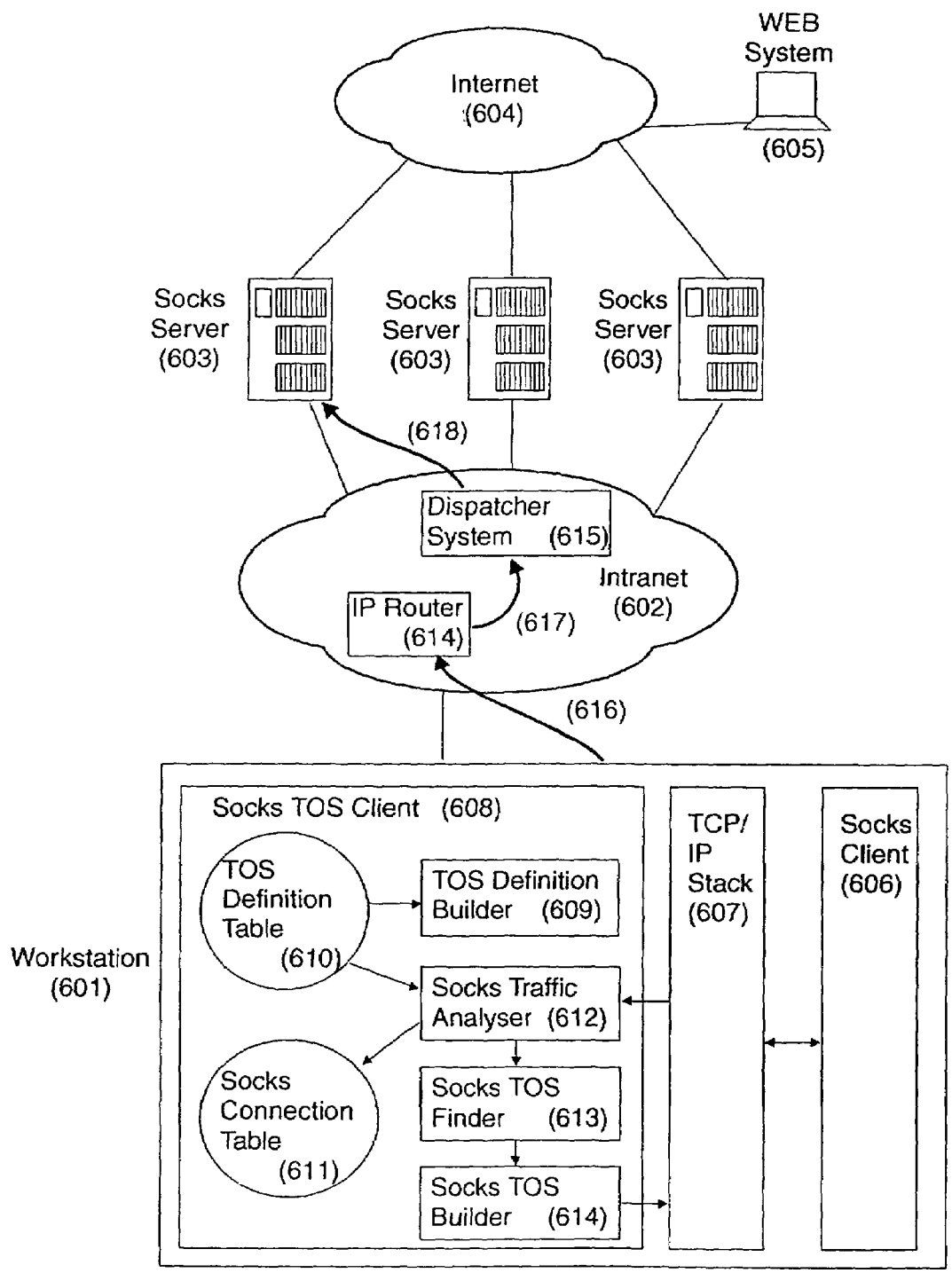
FIG. 6 is an internal view of an end user workstation according to the present invention.

FIG. 6 is a view of the routing and dispatching of IP datagrams according to the present invention. The end user workstation (601) comprises: a Socks client (606), and a TCP/IP Stack (607) (the TCP/IP Stack is in charge of processing all IP datagrams on the workstation). This end user workstation is connected to the Intranet (602), the Intranet comprising multiple Socks servers (603) to access the WEB System (605) connected to the Internet (604).

A dispatcher system (615) located within the Intranet is used to dispatch IP datagrams transporting Socks data on Socks servers (603). The dispatcher system which is viewed by the Intranet network as a Sock Server, receives the IP datagrams originated by the end user workstation (601). Then, it selects the "best" Socks server where to forward the IP datagrams, using information comprised in the Type Of Service (TOS) field in the IP datagram header. For instance an IP datagram with a TOS value of 0 will be forwarded to a low capacity Socks server, while an IP datagram with a TOS value of 7 will be forwarded to another more powerful Socks server. The IP router (614) receives (616) IP datagrams from the end user workstation and routes then within the Intranet towards their destination.

Socks TOS Client

The end user workstation (601) includes a Socks client (606) together with a TCP/IP stack (607). The TCP/IP stack (607) processes all IP datagrams, and is in particular in charge of sending all IP datagrams to the Intranet (602). FIG. 6 further illustrates a Socks TOS client (608) in accordance with the teachings of the present invention.

Socks TOS client (608) determines for each IP datagram a TOS value depending on the Application Level protocol used by the socks data transported in the IP datagram and writes this TOS value in the Type Of Service (TOS) field of the IP datagram. The Socks TOS client (608) is configured with a TOS Definition table (610) that associates a particular TOS value with each Application Level protocol.

When the end user workstation (601) must send an IP datagram comprising Socks data to a Socks server (603), the TCP/IP Stack (607) first forwards the IP datagram to the Socks TOS client (608) within the workstation. The IP datagram is then forwarded in sequence to a plurality of other components within the Socks TOS client (608) which provides the functionality required to performed TOS field setting in accordance with the method of the present invention.

A TOS definition builder (609) builds the TOS Definition table (610) that is used by the Socks TOS client to determine the TOS value of each IP datagram comprising socks data. The TOS Definition table (610) is preferably retrieved from the AutoTOS system described in FIG. 5 by this TOS Definition Builder component.

As further depicted in FIG. 6, a Socks traffic analyzer (612) component analyses the IP datagram and builds a Socks Connection table (611) with the characteristics of the Socks connections using the Application Level protocol of the IP datagram jointly with information comprised in the TOS Definition table (610). Socks TOS client (608) further includes a Sock TOS finder (613) that determines the Type Of Service (TOS) field of the IP datagram, based on the characteristics of a connection as provided within the Socks Connection table (611) jointly with the Source IP Address, Source Port, Destination IP Address and Destination Port fields of the IP datagram. A Socks TOS builder (614) component writes the value determined by the Socks TOS Finder component in the TOS field of the IP datagram.

Socks TOS client finally returns the IP datagram to the TCP/IP Stack (607) component within the end user workstation. This TCP/IP component then sends (616) the IP datagram towards its destination. The present invention does not depend on the TCP/IP Stack component and does not rely on the manner in which the IP datagram is handled and forwarded by this TCP/IP Stack component.

The IP router (614) within the Intranet receives the IP datagram and routes it (617) towards its destination. Possibly, the IP router can process the IP datagram according to the TOS field, using any existing mechanism (for instance IP datagrams with a TOS of 7 can be routed faster than IP datagrams with a TOS of 0). The dispatcher system (615) which receives the IP datagram then selects the "best" Socks server where to forward the IP datagram using for instance the Type Of Service (TOS) field in the IP datagram header, and then forwards (518) the IP datagram to the "best" Socks server.

Optionally, the Socks TOS client (608) can be extended (for instance by means of a configuration parameter of the Socks TOS client) to determine the TOS value and write this TOS value in the TOS field for all IP datagrams. This way, not only IP datagrams comprising Socks data can be processed by the Socks TOS client (608). Socks TOS client (608) then becomes a general "TOS Client" which is no longer specific to Socks traffic. In this case, the Application Level protocols comprised in the TOS Definition table are not interpreted by the Socks TOS client as protocols used by socks data (for instance HTTP transported by socks) but as protocols directly used by TCP data (for instance HTTP transported by TCP).

Socks TOS Client Internal Tables

Figure 7:
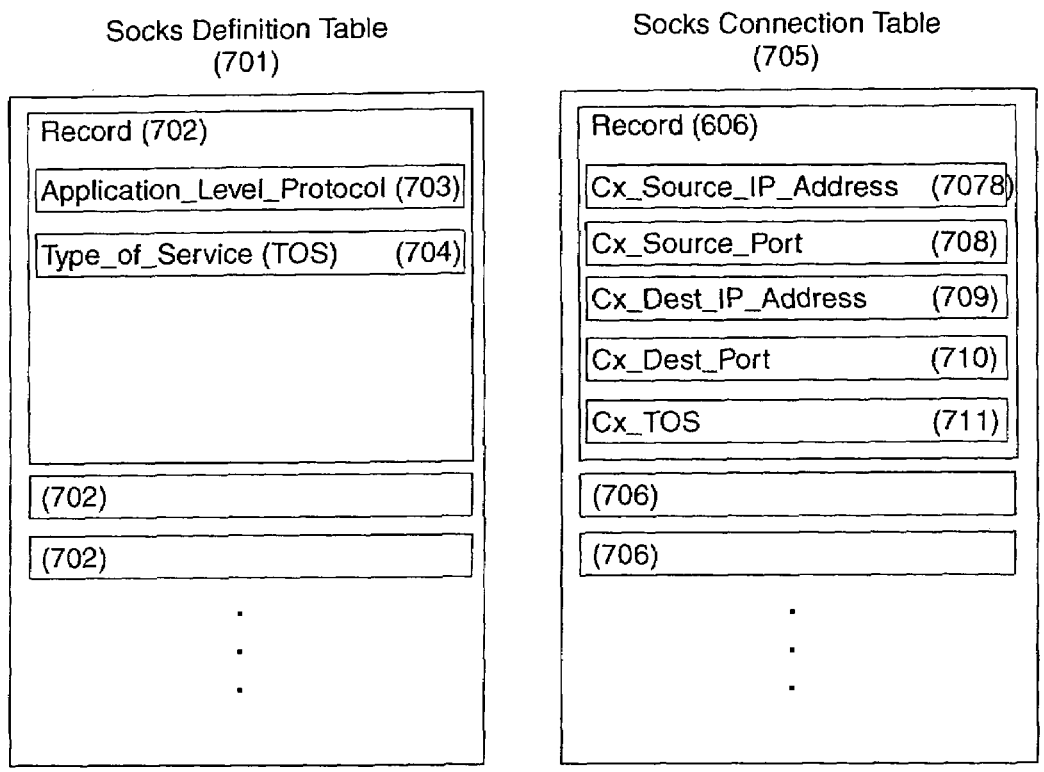
FIG. 7 shows the tables used by the Socks TOS Client according to the present invention.

FIG. 7 depicts the different tables located in the end user workstation. These tables are used by the various components of the Socks TOS client for analyzing Socks data and for determining the value of the Type Of Service (TOS) field. The Socks TOS client on the end user workstation uses a first table called TOS definition table (701) that may be created on an AutoTOS System (506) (for instance by a Network Administrator). The table is then downloaded from the AutoTOS System to the end user workstation. Alternatively, TOS definition table (701) may be created directly on the end user workstation (for instance manually), before starting the Socks TOS client.

TOS definition table (701) includes, for each Application Level protocol, the value that must be written in the TOS field of the IP datagram. The Socks TOS client uses for internal purpose a Socks connection table (705) which is dynamically built. Socks connection table includes the identity (address) of the source device and the Type Of Service (TOS) of each Socks connection.

TOS Definition Table

TOS definition table (701) (a flat file in a preferred embodiment) is created by the Network Administrator in charge of the Intranet. This table associates each Application Level protocol with a Type Of Service value. The table contains a list of records (702), each record comprising the following information.

Application_Level_Protocol (703)(also referred to as ALP) is the unique value for each Application Level protocol. Typically, a record is defined for each of the main WWW protocols including Gopher, HTTP, FTP, Telnet, SSL (this is Secure HTTP). Type_Of_Service (704) (also referred to as TOS) is the value of the TOS associated with the Application Level protocol (703). This TOS value will be written in the TOS field of the IP datagrams transporting the Application Level protocol (703) over Socks. For example, FTP can be associated with a TOS value of 0, while HTTP can be associated with a TOS value of 7. When the TOS field is then used within the Intranet to differentiate the Socks traffic, the HTTP traffic will be treated with a higher priority than the FTP traffic. The TOS definition table also comprises default values (Type_Of_Service default values) for ALP value is not explicitly defined in the table.

Socks Connection Table

The Socks Connection table (705) is an internal table built by the Socks TOS client and is used to store the originator and the Type Of Service of each Socks connection. Socks connection table (705) contains a list of records (706), each record providing the following information. First a Cx_Source_IP_Address (707) is the IP address of the system which is the originator (or source) of the Socks connection (this system is called "originator" or "source device"). A Cx_Source_Port (708) is the number of the Port identifying the program (the application) running on the origin device and which is the originator of the Socks connection. A Cx_Dest_IP_Address (709) is the IP address of the system which is the destination of the Socks connection (this system is called "destination" or "destination device").

A Cx_Dest_Port (710) is the number of the Port identifying the destination program (the application) running on the destination device. The combination of Cx_Source_IP_Address, Cx_Source_Port, Cx_Dest_IP_Address, and Cx_Dest_Port identifies one and only one socks connection.

A Cx_TOS (711) is the value of the TOS field for the Socks connection uniquely identified by Cx_Source_IP Address (707), Cx_Source_Port (708), Cx_Dest_IP Address (709) and Cx_Dest_Port (710). The combination of Cx_Source_IP_Address and Cx_Source_Port identifies the source application running on the source device at the origin of the socks connection. The combination of Cx_Dest_IP_Address and Cx_Dest_Port identifies the destination application running on the destination device at the destination of the socks connection. To identify a TCP connection (not only socks), the combination of Cx_Source_IP_Address, Cx_Source_Port, Cx_Dest_IP_Address, and Cx_Dest_Port must be used.

TOS Definition Builder

Figure 8:
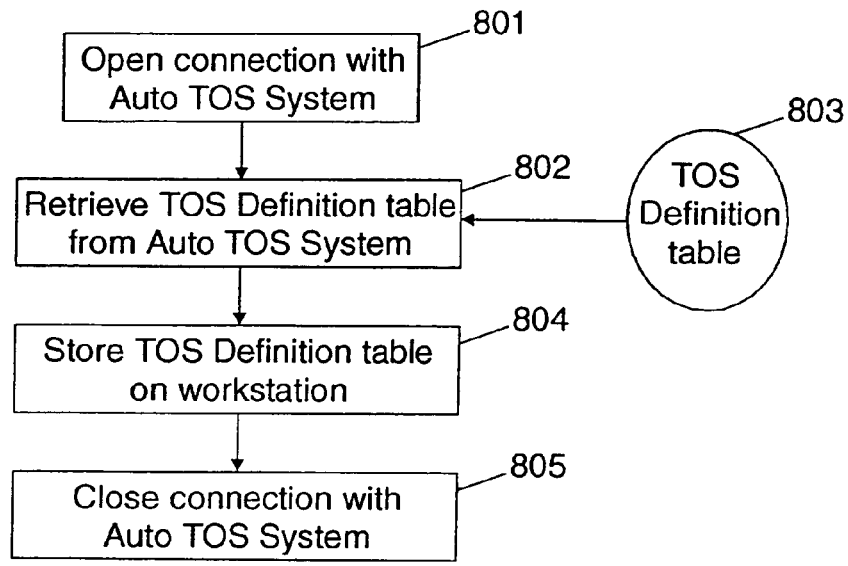
FIG. 8 is a flow chart of the TOS Definition Builder component, according to the present invention.

The TOS Definition Builder (609) component of the Socks TOS client (608) is preferably a computer program running on the end user workstation. TOS Definition Builder (609) builds the Socks Definition table (601) which associates each Application Level protocol with a TOS value. The TOS Definition Builder is the first component initialized when the Socks TOS client is started on the end user workstation. FIG. 8 is a flow chart which refers to the internal logic of the TOS Definition Builder component (609).

As depicted in FIG. 8, step (801) a connection (preferably a TCP connection) is opened with the AutoTOS system (506). AutoTOS system (506) is identified by means of a configuration parameter stored in the Socks TOS client (608) (preferably the IP Address of the AutoTOS system). Proceeding to step (802) the TOS definition table (803) is retrived from AutoTOS system (506). Preferably, the protocol used to retrieve the table is FTP or HTTP.

Next, as shown at step (804) the TOS definition table is stored locally on the workstation (501). Step (805) depicts closing the connection with the AutoTOS system. Optionally, the TOS definition table can be manually placed on end user workstation instead of being retrieved from an AutoTOS system. Also optionally, the TOS definition table is periodically updated. The TOS Definition Builder component can periodically retrieve the TOS definition table from the AutoTOS system. An update of the TOS definition table can also be automatically sent to end user workstations by the AutoTOS system.

Socks Traffic Analyzer

The Socks traffic analyzer (612) component of the Socks TOS client (608) is preferably a computer program running on the end user workstation. Socks traffic analyzer (612) determines the Application Level protocol of each IP datagram received by the Socks TOS client, and builds the Socks Connection table (705).

Figure 9:
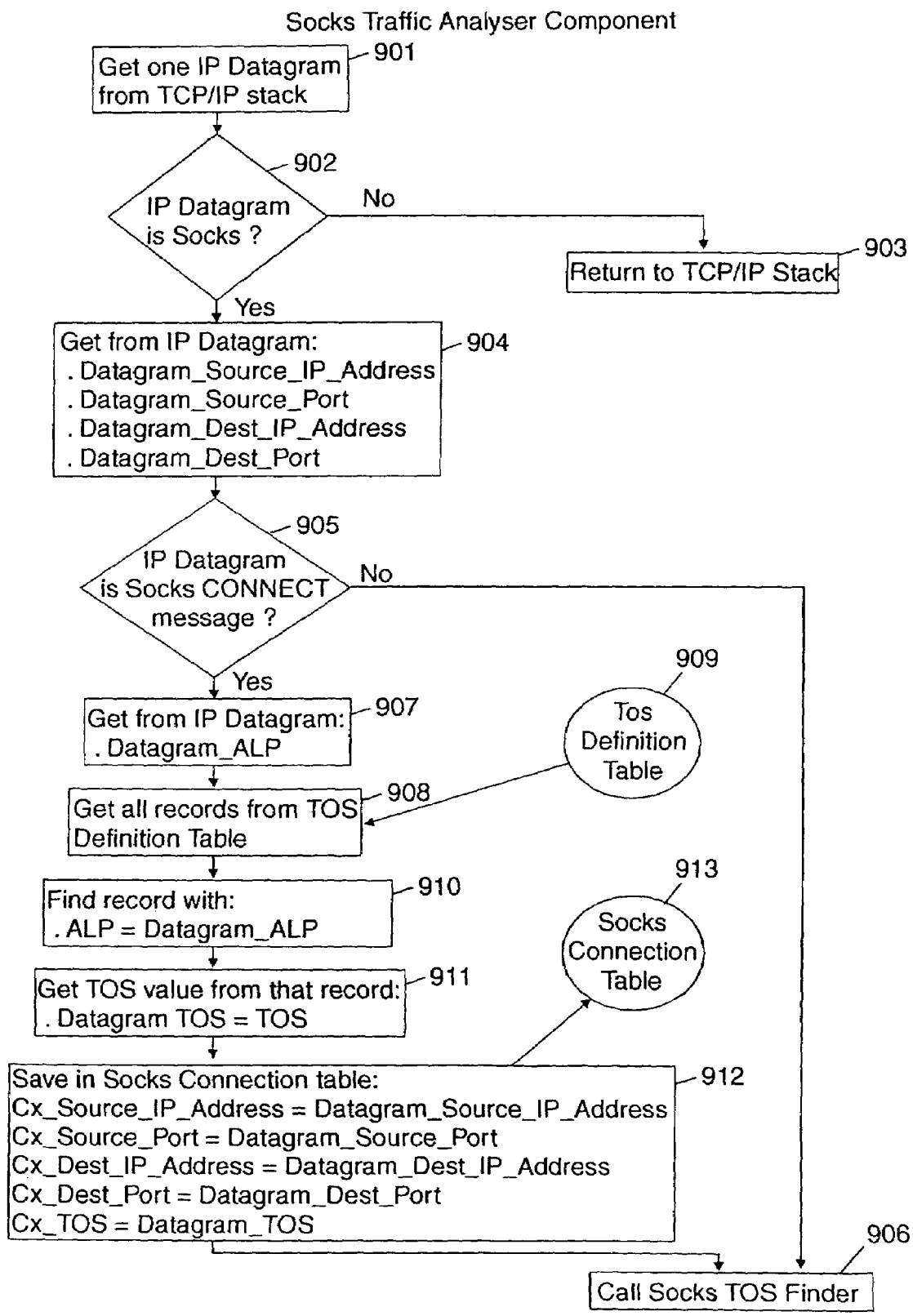
FIG. 9 is a flow chart of the Socks Traffic Analyser according to the present invention.

FIG. 9 is a flow chart depicting the internal logic flow of Socks traffic analyzer (612). As shown at step (901) Socks traffic analyzer (612) retrieves an IP datagram from the TCP/IP Stack component. Next, as depicted at step (902) Socks traffic analyzer (612) tests whether the IP datagram transports Socks traffic or not. This test preferably uses the Destination Port field of the TCP header comprised in the Data part of the IP datagram. The Destination Port is compared to the Port that uses the Socks protocol (by default, the Port used by Socks is 1080). For instance, the Port used by the Socks protocol can be a configuration parameter of the Socks TOS client. If the Destination Port in the TCP header is equal to the Port used by Socks, then the IP datagram transports Socks traffic, otherwise the IP datagram does not transports Socks traffic and does not need to be processed by the Socks TOS client.

If as illustrated at step (903) the IP datagram does not transport Socks traffic, the Socks TOS client is not involved in the processing of non Socks traffic. The IP datagram is directly returned to the TCP/IP Stack, which then sends it towards its destination. The processing by the Socks TOS client of the IP datagram is completed. The Socks TOS client waits for the next IP datagram.

If as depicted at step (904) the IP datagram transports Socks traffic the socks connection is identified. The originator and the destination of the IP datagram can be identified directly or by the information comprised in the IP header and TCP header:

Datagram_Source_IP_Address=Source IP Address field (in IP header).

Datagram_Source_Port=Source Port field (in TCP header).

Datagram_Dest_IP_Address=Dest IP Address field (in IP header).

Datagram_Dest_Port=Dest Port field (in TCP header).

Proceeding to step (905) a determination is made of whether or not the IP datagram is a Socks CONNECT message. A Socks CONNECT message is identified by the CD field in the Application Level message (CD=1). If the IP datagram is a not a Socks CONNECT message, and as shown at step (906) the Socks TOS finder component is called. The IP datagram therefore belongs to a Socks connection which is already established. This means that a CONNECT message has already been received and the corresponding record has been created in the Socks Connection table.

If the IP datagram is a Socks CONNECT message, and as depicted at step (907), the Application Level protocol (ALP) is determined from the IP datagram transported by the Socks connection (in the Destport field of the Socks CONNECT message: Datagram_ALP=Destport field within Socks CONNECT message).

Next, at step (908) all records from the TOS definition table (909) are retrieved. The TOS definition table is preferably read only once for all and cached by the Socks traffic analyzer at configuration time, in order to minimize the impact on performances. As illustrated at step (910) the record corresponding to the Application Level protocol (ALP) of the IP datagram is found. This found record includes Application_Level_Protocol=Datagram_ALP.

the TOS of the IP datagram (Datagram_TOS=Type_Of_Service) is then determined from the found record as shown at step (911). The information for the Socks connection is saved in a new record within the Socks Connection table (913) as shown at step (912). This saved Socks connection information includes the following:

Cx_Source_IP_Address=Datagram_Source_IP_Address
Cx_Source_Port=Datagram_Source_Port
Cx_Dest_IP_Address=Datagram_Dest_IP_Address
Cx_Dest_Port=Datagram_Dest_Port
Cx_TOS=Datagram_TOS.

Step (906) illustrates a call to the Socks TOS Finder component required to find the record.

Optionally, all IP datagrams not comprising Socks data can also be processed by the Socks traffic analyzer. In this case, the Datagram_ALP is identified by the Destination Port field in the TCP header.

Socks TOS Finder

Figure 10:
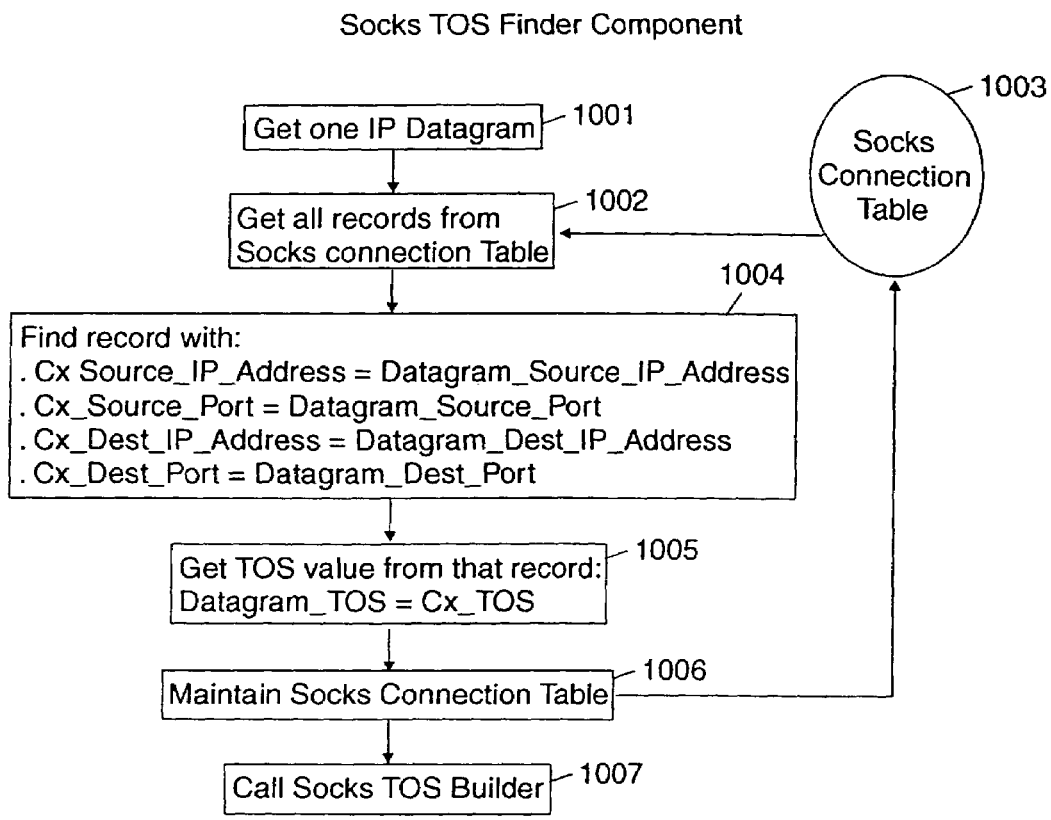
FIG. 10 is a flow chart of the Socks TOS Finder according to the present invention.

The Socks TOS Finder component of the Socks TOS client is preferably a computer program running on the end user workstation. This component determines a TOS value for each IP datagram, using the Socks Connection table (705). FIG. 10 is a flow chart which depicts the internal logic flow of the Socks TOS Finder component. As shown at step (1001), the Socks TOS Finder component retrieves the IP datagram forwarded by the Socks traffic analyzer component, along with the Datagram_Source_IP_Address, the Datagram_Source_Port, the Datagram_Dest_IP_Address, and the Datagram_Dest_Port.

At step (1002) the Socks TOS Finder component retrieves all records from the Socks Connection table (1003). Next at step (1004), the Socks TOS Finder component finds the record which corresponds to the Socks connection. This record is identified by the following four conditions:

Cx_Source_IP_Address=Datagram_Source_IP_Address
Cx_Source_Port=Datagram_Source_Port
Cx_Dest_IP_Address=Datagram_Dest_IP_Address
Cx_Dest_Port=Datagram_Dest_Port Proceeding to step (1005), the Socks TOS Finder component retrieves the Type Of Service (TOS) which corresponds to that Socks connection, from that record. This is the value of the TOS field (Datagram_TOS=Cx_TOS) that must be written in the IP datagram. As illustrated at step (1006), the Socks TOS Finder component removes from the Socks Connection table (1003) records of closed Socks connections (terminated connections). Closed Socks connections are detected for instance using the FIN and ACK indications in the TCP header. Optionally, a Socks connection is considered closed after a certain period of time without IP datagram on that Socks connection (this timer value can be for instance a configuration parameter of the Socks TOS client). Any other existing algorithm to detect closed or half closed (for instance when one extremity of the connection has abnormally terminated) TCP connections can also be used to remove such connections from the table. Finally, as depicted at step (1007), the Socks TOS Finder component calls the Socks TOS Builder component.

Socks TOS Builder

Figure 11:
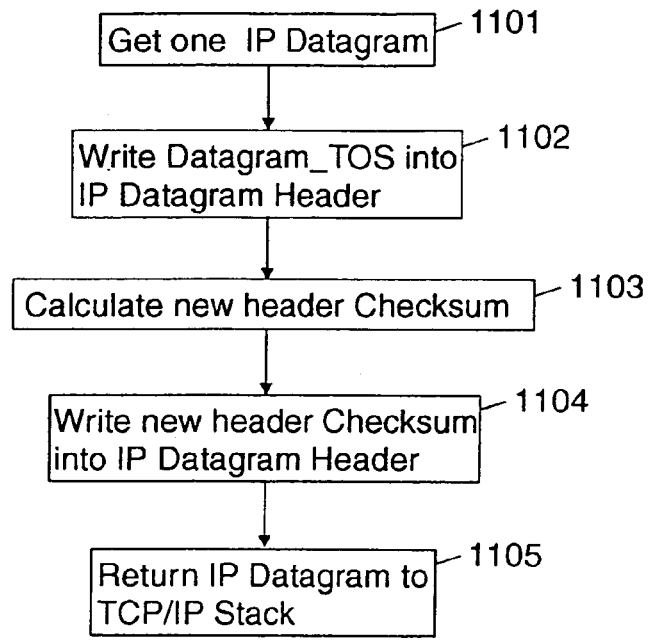
FIG. 11 is a flow chart of the Socks TOS Builder according to the present invention.

The Socks TOS Builder component of the Socks TOS client is preferably a computer program running on the end user workstation. This component writes in the Type Of Service (TOS) field of each IP datagram the TOS value determined by the Socks TOS Finder component. FIG. 11 is a flow chart illustrating the internal logic flow of the Socks TOS Builder component. As depicted at step (1101), the Socks TOS Builder component retrieves the IP datagram forwarded by the Socks TOS Finder component, along with the Datagram_TOS. Next at step (1102), the Socks TOS Builder component sets the TOS field of the IP datagram with the Datagram_TOS. The Datagram_TOS overwrites the value of the TOS field present in the received IP datagram. Optionally, the TOS value written in the TOS field of the IP datagram can be a combination of both the TOS value in the IP datagram forwarded by the TCP/IP Stack, and the TOS value determined by the Socks TOS Finder component.

As shown at step (1103), the Socks TOS Builder component calculates the new value of the header checksum field in the IP datagram header. The header checksum is a combination of all fields in the IP datagram header and is used by the destination of the IP datagram to make sure that all fields in the IP datagram header have not been altered in the network. Since one of the IP Datagarm header fields (the TOS) used to calculate the header checksum has been modified by the Socks TOS Builder, the header checksum received in the IP datagram must be updated. The new value is calculated using the existing algorithm used by any program which builds IP datagrams.

Proceeding to step (1104), the Socks TOS Builder component writes the new value of the header checksum field in the IP datagram. Finally, at step (1105), the Socks TOS Builder component forwards the IP datagram to the TCP/IP Stack component. The TCP/IP Stack then sends the IP datagram towards its destination. The Socks TOS client exits and waits for the next IP datagram.

Advantages

The present inventions provides the following advantages.

The Type Of Service (TOS) field of IP datagrams is representative of the Application Level protocol used for transporting socks data. Any network device, such as a dispatcher system, can use this TOS field for differentiating IP datagrams according to the Application Level protocol used for transporting Socks data. For instance, HTTP traffic for the WEB can be set with a TOS value of 7, while batch FTP traffic can be set with a TOS value of 0. A dispatcher system can then use the TOS field to dispatch:

HTTP traffic to a high capacity Socks server, and

FTP traffic to a low capacity Socks server with low capacity.

Thus, an optimized response time and availability can be provided to HTTP traffic.

Network devices such as IP routers may use the TOS field of the IP datagrams to determine some IP datagram characteristics such as the priority. Since the present invention associates a TOS value with the Application Level protocol, it therefore enables IP routers to process IP datagrams according to the Application Level protocol used by the Socks data they transport. For instance, IP routers within the network may already process and route IP datagrams with a TOS value of 7 faster than IP datagrams with a TOS value of 0. When HTTP is associated with TOS 7 and FTP is associated with TOS 0, the IP router will route and process faster the HTTP traffic. This mechanism provides an optimized response time for the HTTP WEB traffic.

The definition of TOS values according to the Application Level protocols used by Socks data (the TOS definition table) can be centrally administered on the AutoTOS system. A Network Administrator can control the TOS definition table for all end user workstations.

The Definition TOS table can be periodically and automatically retrieved from the AutoTOS system by the end user workstations. This way, updates of the TOS definition table on the AutoTOS system (either manually by a Network Administrator or by automated processes) are automatically transferred to end user workstations.

For instance, in case of heavy network congestion, the TOS value for the Telnet traffic may be decreased from 5 to 0 (assuming 0 corresponds to the lowest priority for IP datagrams which can be discarded within the network) in the TOS definition table located on the AutoTOS system. This updated TOS definition table is then automatically retrieved by all end user workstations (or distributed to all end user workstations). Thus, the Telnet traffic can be discarded within the network. As a consequence, the network congestion can be reduced and protocols with higher priority such as HTTP have a better chance to survive the congestion.

The association between TOS value and Application Level protocol (TOS definition table) can be dynamically built when the end user workstation get connected to the AutoTOS system. Different TOS definition tables can be returned to different end user workstations depending on some criteria such as the IP address of the end user workstation.

For instance, one group of end users (group0) may then use a TOS value of 0 for FTP, while another group of end users (group1) may use a TOS value of 1 for that same FTP protocol. IP datagrams having a TOS value of 1 will be handled with a higher priority than IP datagrams having a TOS value of 0. The FTP service provided to group1 will offer better performances than the FTP service provided to group0.

The TOS value is written in the TOS field of IP datagrams by end user workstations and not by any network device within the Intranet. Since companies usually own their end user workstations but may not own their intranet backbone network, it can be easier for them to implement a policy for associating TOS values and Application Level protocols on their end user workstations rather than on any network device. For instance, companies which do not own their Intranet backbone network but instead lease it from a Service Provider, can implement a policy on their end user workstations for the association. This way, they do not have to rely on their Network Provider for providing such policy.

The TOS field in not modified within the network by the network devices (such as IP routers). There is therefore no impact on the performance of these network devices.

While the invention has been particularly shown and described with reference to a preferred embodiment, it will be understood that various changes in form and detail may be made therein without departing from the spirit, and scope of the invention.

What is claimed is:

1. A method for setting a value within a type of service (TOS) field in an Internet Protocol (IP) datagram, wherein said IP datagram being sent from a source application that resides within a source device to a destination application that resides within a destination device, said method comprising:

determining whether or not said IP datagram is a socks connect message;

in response to a determination that said IP datagram is a socks connect message, determining from said IP datagram an Application Level protocol (ALP) transported by a socks connection;

locating from a type of service (TOS) definition table a record corresponding to said ALP of said IP datagram; and determining from said located record a TOS value; and subsequently writing said determined TOS value into said TOS field of said IP datagram, wherein said TOS value is based on said ALP transported by said socks connection.

2. The method of claim 1, wherein said IP datagram includes an IP header having a source IP address field and a destination IP address field, wherein said IP datagram further includes a source port field and a destination port field, wherein said method further includes:

reading a source device address of said source device from said source IP address field;

reading a destination device address of said destination device address from said destination IP address field;

reading a source application address of said source device from said source port field;

reading a destination application address of said destination device from said destination port field.

3. The method of claim 1, wherein said IP datagram includes a header checksum field, wherein said writing said determined TOS value further includes:

computing a header checksum value for said IP datagram according to said TOS value; and writing said computed header checksum value into said header checksum field.

4. The method of claim 1, wherein said method further includes storing in a socks connection table a new entry containing said TOS value.

5. The method of claim 1, wherein said determining whether or not said IP datagram is a socks connect message is performed by a socks traffic analyser component within associated with said source device.

6. The method of claim 1, wherein said writing said determined TOS value is performed by a socks TOS finder component within associated with said source device.

7. A system for setting a value within a type of service (TOS) field in an Internet Protocol (IP) datagram, wherein said IP datagram being sent from a source application that resides within a source device to a destination application that resides within a destination device, said system comprising:

means for determining whether or not said IP datagram is a socks connect message;
in response to a determination that said IP datagram is a socks connect message,
  means for determining from said IP datagram an Application Level protocol (ALP) transported by a socks connection;
  means for locating from a type of service (TOS) definition table a record corresponding to said ALP of said IP datagram; and
  determining from said located record a TOS value; and
means for subsequently writing said determined TOS value into said TOS field of said IP datagram, wherein said TOS value is based on said ALP transported by said socks connection.

8. The system of claim 7, wherein said IP datagram includes an IP header having a source IP address field and a destination IP address field, wherein said IP datagram further includes a source port field and a destination port field, wherein said system further includes:

means for reading a source device address of said source device from said source IP address field;
means for reading a destination device address of said destination device address from said destination IP address field;
means for reading a source application address of said source device from said source port field;
means for reading a destination application address of said destination device from said destination port field.

9. The system of claim 7, wherein said IP datagram includes a header checksum field, wherein said writing said determined TOS value further includes:

means for computing a header checksum value for said IP datagram according to said TOS value; and
means for writing said computed header checksum value into said header checksum field.

10. The system of claim 7, wherein said system further includes means for storing in a socks connection table a new entry containing said TOS value.

11. The system of claim 7, wherein said means for determining whether or not said IP datagram is a socks connect message is a socks traffic analyser component within associated with said source device.

12. The system of claim 7, wherein said means for writing said determined TOS value is a socks TOS finder component within associated with said source device.

13. A computer program product for setting a value within a type of service (TOS) field in an Internet Protocol (IP) datagram, wherein said IP datagram being sent from a source application that resides within a source device to a destination application that resides within a destination device, said computer program product comprising:

program code means for determining whether or not said IP datagram is a socks connect message;
in response to a determination that said IP datagram is a socks connect message,
  program code means for determining from said IP datagram an Application Level protocol (ALP) transported by a socks connection;
  program code means for locating from a type of service (TOS) definition table a record corresponding to said ALP of said IP datagram; and
  determining from said located record a TOS value; and
program code means for subsequently writing said determined TOS value into said TOS field of said IP datagram, wherein said TOS value is based on said ALP transported by said socks connection.

14. The computer program product of claim 13, wherein said IP datagram includes an IP header having a source IP address field and a destination IP address field, wherein said IP datagram further includes a source port field and a destination port field, wherein said computer program product further includes:

program code means for reading a source device address of said source device from said source IP address field;
program code means for reading a destination device address of said destination device address from said destination IP address field;
program code means for reading a source application address of said source device from said source port field;
program code means for reading a destination application address of said destination device from said destination port field.

15. The computer program product of claim 13, wherein said IP datagram includes a header checksum field, wherein said writing said determined TOS value further includes:

program code means for computing a header checksum value for said IP datagram according to said TOS value; and
program code means for writing said computed header checksum value into said header checksum field.

16. The computer program product of claim 13, wherein said computer program product further includes program code means for storing in a socks connection table a new entry containing said TOS value.

17. The computer program product of claim 13, wherein said program code means for determining whether or not said IP datagram is a socks connect message is a socks traffic analyser component within associated with said source device.

18. The computer program product of claim 13, wherein said program code means for writing said determined TOS value is a socks TOS finder component within associated with said source device.

* * * * *